(12) United States Patent
Park et al.

(10) Patent No.: US 11,814,491 B2
(45) Date of Patent: Nov. 14, 2023

(54) TRANSPARENT FILM, OPTICAL MATERIAL COMPRISING THE SAME, AND DISPLAY DEVICE COMPRISING THE SAME

(71) Applicants: SK Innovation Co., Ltd., Seoul (KR); SK IE Technology Co., Ltd., Seoul (KR)

(72) Inventors: Min Sang Park, Daejeon (KR); Jin Hyung Park, Daejeon (KR); Seung Min Jeon, Daejeon (KR); Yoo Seock Hwang, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 327 days.

(21) Appl. No.: 16/985,562

(22) Filed: Aug. 5, 2020

(65) Prior Publication Data

US 2021/0040282 A1 Feb. 11, 2021

(30) Foreign Application Priority Data

Aug. 9, 2019 (KR) .................. 10-2019-0097130

(51) Int. Cl.
*C08J 5/18* (2006.01)
*C08G 73/10* (2006.01)

(52) U.S. Cl.
CPC ................ *C08J 5/18* (2013.01); *C08G 73/10* (2013.01); *C08J 2379/08* (2013.01)

(58) Field of Classification Search
CPC ......... C08L 79/08; C08G 73/14; C08G 73/10; C08J 2379/08; C08J 5/18
See application file for complete search history.

(56) References Cited

U.S. PATENT DOCUMENTS

| 2013/0052434 A1 | 2/2013 | Asahi et al. |
| 2018/0112049 A1 | 4/2018 | Song et al. |

FOREIGN PATENT DOCUMENTS

| JP | 2007-169339 | * | 6/2007 |
| JP | 2012103651 | * | 5/2012 |
| JP | 2013241556 A | | 12/2013 |
| KR | 1020080114526 A | | 12/2008 |
| KR | 1020170079114 A | | 7/2017 |
| KR | 1020170079743 A | | 7/2017 |
| KR | 1020170112475 A | | 10/2017 |
| KR | 101831598 | * | 2/2018 |
| KR | 101831598 B1 | | 2/2018 |
| KR | 1020180044189 A | | 5/2018 |

* cited by examiner

*Primary Examiner* — Gregory Listvoyb
(74) *Attorney, Agent, or Firm* — THE WEBB LAW FIRM

(57) ABSTRACT

Provided are a transparent film, an optical material including the same, and a display device including the same.

8 Claims, 1 Drawing Sheet

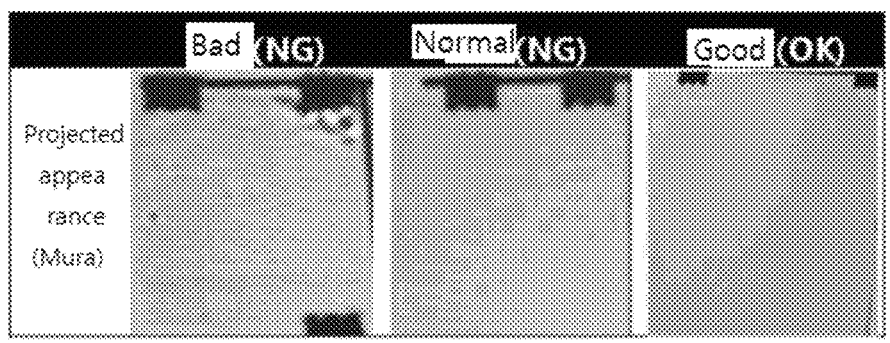

TRANSPARENT FILM, OPTICAL MATERIAL COMPRISING THE SAME, AND DISPLAY DEVICE COMPRISING THE SAME

CROSS-REFERENCE TO RELATED APPLICATION

This application claims priority to Korean Patent Application No. 10-2019-0097130 filed Aug. 9, 2019, the disclosure of which is hereby incorporated by reference in its entirety.

TECHNICAL FIELD

The following disclosure relates to a transparent film, an optical material comprising the same, and a display device comprising the same. More particularly, the following disclosure relates to a transparent film whose optical property such as visibility is excellent, an optical material comprising the same, and a display device comprising the same.

BACKGROUND

A substrate material for a flexible display that has been prominent as a next-generation display device should be light, unbreakable, and bendable, and should not have a restriction in its form due to its easy workability.

In addition, a glass substrate is currently used as a substrate material of a display device. However, the glass substrate may be easily broken by an external impact, such that the glass substrate is easily damaged when being used in the display device. Further, the glass substrate does not have flexibility, such that it is difficult to use the glass substrate in the flexible display. Accordingly, a polymer, which is a material that is light, unbreakable, and capable of manufacturing a thin film, has been prominent as the most suitable material for implementing the flexible display.

When a polymer film is manufactured by a solution casting process using such a polymer, a mura phenomenon in which a mura is generated during projection occurs. When the above-described mura phenomenon occurs, an image of the display device is distorted, which causes a decrease in visible clarity of display.

Accordingly, in order to improve the display device, it is necessary to improve appearance quality that visibility of the polymer film is poor depending on a specific angle or light.

SUMMARY

An embodiment of the present invention is directed to providing a transparent film that suppresses a chrominance non-uniformity mura phenomenon in which a color is not uniform and looks like a stain, and a display device comprising the same.

Another embodiment of the present invention is directed to providing a high-quality display device having excellent visibility due to clear image quality.

In one general aspect, there is provided a transparent film in which light which is generated when one polarized light is transmitted through the film and in which two waves are mixed with each other satisfies the following Relational Expressions 1 and 2:

$$0.90\ A \leq T \leq 1.10\ A \quad \text{[Relational Expression 1]}$$

$$\theta \leq 30 \quad \text{[Relational Expression 2]}$$

wherein

T is the sum of magnitudes of amplitudes when two waves of the transmitted light interfere with each other, A is a wave's amplitude of the polarized light, and θ is a retardance angle (°) of a wave traveling to a slow axis of the transparent film, of the two waves.

The transparent film may be a polyimide-based film.

The transparent film may have an average amplitude of a surface roughness curve of 1 to 1,000 nm.

The transparent film may have a curved area of 70% or less with respect to the overall surface area.

The transparent film may have a thickness of 20 to 200 μm.

The transparent film may have a residual solvent content within 3% by weight with respect to the total weight of the film.

Upon drying the transparent film, drying may be performed in a drying region consisting of any one or two more nozzles selected from an impinged nozzle, a parallel flow nozzle, and a venturi type nozzle.

In another general aspect, there is provided an optical material comprising the transparent film described above.

In another general aspect, there is provided a display device comprising the optical material described above.

Other features and aspects will be apparent from the following detailed description, the drawing, and the claims.

BRIEF DESCRIPTION OF THE DRAWINGS

FIG. 1 is a photograph obtained by visually observing an appearance when a transparent film according to an example and a comparative example of the present invention is projected.

DETAILED DESCRIPTION OF EMBODIMENTS

Hereinafter, the present invention will be described in more detail with reference to embodiments and examples including accompanying drawing. The following specific examples and examples are only a reference for describing the present invention in detail, and are not limited thereto, and may be implemented in various forms.

In addition, all technical terms and scientific terms have the same meanings as those commonly understood by a person skilled in the art to which the present invention pertains unless otherwise defined. The terms used herein are only for effectively describing certain embodiments, and are not intended to limit the present invention.

Throughout the present specification describing the invention, unless explicitly described to the contrary, "comprising" any component will be understood to imply the further inclusion of other elements rather than the exclusion of other elements.

In addition, singular forms used in the detailed description and the claims are intended to include the plural forms unless otherwise indicated in context.

The inventors have found that when observing by transmitting light through the optically transparent film, if a phase relationship between two waves satisfied a specific range, a mura phenomenon in which a mura is generated due to chrominance non-uniformity, does not occur, and thus appearance quality and visibility may be significantly improved. Therefore, the present invention has been completed.

In order to achieve the above object, in the transparent film according to the present invention, light which is generated when one polarized light is transmitted through the film and in which two waves mixed with each other satisfies the following Relational Expressions 1 and 2:

$$0.90\,A \leq T \leq 1.10\,A \quad \text{[Relational Expression 1]}$$

$$\theta \leq 30 \quad \text{[Relational Expression 2]}$$

wherein

T is the sum of magnitudes of amplitudes when the two waves of the transmitted light interfere with each other, A is a wave's amplitude of the polarized light, and θ is a retardance angle (°) of a wave traveling to a slow axis of the transparent film, of the two waves.

Specifically, in the transparent film according to the present invention, when two waves of the same wavelength and amplitude from one light source have reached a point through different paths, a phase relationship generated by a path difference satisfies the above Relational Expressions 1 and 2.

In addition, T according to the present invention, specifically, may be the sum of magnitudes of amplitudes (W1) when the two waves of the transmitted light constructively interfere with each other and magnitudes of amplitudes (W2) when the two waves of the transmitted light destructively interfere with each other.

In addition, specifically, two waves transmitted through an optically anisotropic film have two traveling speeds depending on a polarization direction, resulting in a phase difference, in which a polarization direction where the speed of light is fast is called a fast axis, and a polarization direction where the speed of light is slow, which is an axis perpendicular to the fast axis, is called a slow axis. Based thereon, θ represents a retardance angle of the wave traveling to the slow axis.

The transparent film according to the present invention may have optical anisotropy. Due to the optical anisotropy of the transparent film as described above, the two waves of the light generated during the transmission of the light through the transparent film may have a phase difference therebetween, and the above Relational Expressions 1 and 2 may be satisfied.

The transparent film according to the present invention satisfies the above Relational Expressions 1 and 2, such that when white light is projected onto the transparent film, the mura phenomenon in which the mura is generated due to chrominance non-uniformity, is minimized, and the appearance quality is excellent. Thus, the optical material and the display device manufactured therefrom may have excellent visibility.

According to an aspect of the present invention, the above Relational Expression 1 may preferably satisfy 0.92 A to 1.08 A, and more preferably, 0.95 A to 1.05 A. The above Relational Expression 2 may preferably be less than 30°, and more preferably less than 29°. If Relational Expressions 1 and 2 are satisfied as described above, when white light is projected onto the transparent film, the mura phenomenon in which the mura is generated due to chrominance non-uniformity may hardly occur, thereby preventing image distortion and implementing excellent visibility.

According to an aspect of the present invention, the transparent film has transparency, and specifically, may have a total light transmittance of 70 to 99%, as measured using a model 300 manufactured by Nippon Denshoku according to the specification of ASTM E313 based on a thickness of 30 to 80 µm, preferably, 80 to 99%, and more preferably, 90 to 99%.

According to an aspect of the present invention, the transparent film may be a polyimide-based film. The polyimide-based film has excellent transparency, heat resistance, chemical resistance, mechanical properties, electrical properties and dimensional stability, and is advantageous for lightening, thinning, and flexibility, making it excellent to apply to a flexible display device.

According to an aspect of the present invention, the polyimide-based film may be provided as a polyimide film comprising a polyimide resin derived and polymerized from a monomer mixture including dianhydride and diamine. The dianhydride and diamine are not particularly limited as long as they are known materials commonly used.

According to an aspect of the present invention, the diamine may be, for example, any one or a mixture of two or more selected from an aliphatic diamine and an aromatic diamine.

More specifically, the aromatic diamine is not particularly limited, but may be, for example, any one or a mixture of two or more selected from bistrifluoromethylbenzidine (TFDB), bis(3-aminophenyl)sulfone (3DDS), bis(4-aminophenyl)sulfone (4DDS), diaminophenyl ether, o-phenylenediamine (o-PDA), p-phenylenediamine (p-PDA), m-phenylenediamine (m-PDA), oxydianiline (ODA), methylenedianiline (MDA), bisaminophenylhexafluoropropane (HFDA), and 1,3-bis(4-amino phenoxy)benzene (TPE-R).

The aliphatic diamine is not particularly limited, but may be, for example, any one or a mixture of two or more selected from 1,4-diaminocyclohexane, 1,4-cyclohexanebis (methylamine), 4,4'-diaminodicyclohexylmethane (MCA), 4,4'-methylene bis(2-methyl cyclohexylamine) (MMCA), ethylenediamine (EN), 1,3-diaminopropane (13DAP), tetramethylenediamine, 1,6-hexamethylenediamine (16DAH), and 1,12-diaminododecane (112DAD).

According to an aspect of the present invention, the dianhydride may be any one or a mixture of two or more selected from an aliphatic dianhydride and an aromatic dianhydride.

More specifically, according to an aspect of the present invention, the aromatic dianhydride is not particularly limited, but may be, for example, any one or a mixture of two or more selected from 4,4'-hexafluoroisopropylidene diphthalic anhydride (6FDA), 1,2,4,5-benzenetetracarboxylic dianhydride (PMDA), biphenyltetracarboxylic dianhydride (BPDA), benzophenonetetracarboxylic dianhydride (BTDA), 4,4'-oxydiphthalic dianhydride (ODPA), and bis-dicarboxyphenoxy diphenylsulfide dianhydride (BDSDA).

The aliphatic dianhydride is not particularly limited, but may be, for example, any one or a mixture of two or more selected from 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclooctene-2,3,5,6-tetracarboxylic dianhydride (BODA), 1,2, 3,4-cyclopentanetetracarboxylic dianhydride (CPDA), 1,2, 4,5-cyclohexanetetracarboxylic dianhydride (CHDA), 1,2, 4-tricarboxy-3-methylcarboxycyclopentane dianhydride, and 1,2,3,4-tetracarboxycyclopentane dianhydride.

According to an aspect of the present invention, the dianhydride may be copolymerized with 5 to 80 moles and preferably 10 to 70 moles with respect to 100 moles of diamine.

When dianhydride is included in the above-described range, a polyimide film having excellent visibility and optical properties may be provided.

The polyimide film manufactured from the above-described composition may suppress a micro non-uniformity phenomenon of the surface to minimize the mura phenomenon in which the mura is generated on the film.

According to an aspect of the present invention, the polyimide-based film may be provided as a polyamideimide film by further including an aromatic diacid dichloride in the monomer mixture in order to improve mechanical properties.

The aromatic diacid dichloride is not particularly limited, but may be, for example, any one or a mixture of two or more selected from terephthaloyl dichloride (TPC), isophthaloyl dichloride (IPC), 1,1'-biphenyl-4,4'-dicarbonyl dichloride (BPC), 1,4-naphthalenedicarboxylic dichloride (1,4-NaDC), 2,6-naphthalenedicarboxylic dichloride (2,6-NaDC), 1,5-naphthalenedicarboxylic dichloride (1,5-NaDC), etc. It is preferable to include any one or two or more selected from terephthaloyl dichloride and isophthaloyl dichloride.

In addition, the aromatic diacid dichloride is not limitedly used as the above-described exemplary compounds, and may be further used in combination with other acid halide compounds, but preferably the aromatic diacid dichloride is used alone.

According to an aspect of the present invention, the aromatic diacid dichloride may be copolymerized with 20 to 95 moles and preferably 30 to 90 moles with respect to 100 moles of diamine.

The polyamideimide film manufactured from the above-described composition may not only have excellent mechanical properties and heat resistance, but also provide excellent display quality even at a high temperature, and provide optical properties that maintain high transparency.

According to an aspect of the present invention, the dianhydride and aromatic diacid dichloride may be included in a molar ratio of 5:95 to 80:20, and preferably in a molar ratio of 10:90 to 70:30.

According to an aspect of the present invention, when a surface roughness is measured by an optical microscope in an area of 5 mm×5 mm, the transparent film may have an average amplitude of a surface roughness curve of 1 to 1,000 nm. The transparent film may have an average amplitude of a surface roughness curve of preferably, 1 to 100 nm, more preferably, 1 to 80 nm, and the most preferably 1 to 30 nm. When the transparent film has the average amplitude of a surface roughness curve as described above, the mura, such as an optical pattern on the film surface may be significantly reduced depending on light or angle, and thus excellent surface quality may be provided.

According to an aspect of the present invention, the transparent film may have a curved area of 70% or less with respect to the overall surface area of 5 mm×5 mm. Here, the curved area refers to an area in which the average step, Ra value, of the surface flexure deviates by 30 nm when the step of a plane without flexure is zero (0), as measured with a confocal microscope. Specifically, the transparent film may have the curved area of 0.1 to 70% with respect to the overall surface area. The transparent film may have, preferably, the curved area of 1 to 65%, and more preferably, 1 to 62% with respect to the overall surface area. When the curved area satisfies the above-described range, a projected mura due to the curved area may be reduced, and further, when the average amplitude of a surface roughness curve satisfies the above-described range at the same time, the mura phenomenon may be reduced and the display quality may be improved due to improved visibility.

According to an aspect of the present invention, the transparent film may have a residual solvent content within 3% by weight with respect to the total weight of the film. Specifically, the transparent film may have the residual solvent content of 0.01 to 3% by weight, and preferably, 0.01 to 2% by weight with respect to the total weight of the film. Here, the residual solvent content was measured relative to a weight except for a solid content in a coating solution before drying. The transparent film has the residual solvent content as described above, such that degradation in physical properties may be prevented, and no swelling or shrinkage occurs by an external environment. Thus, reliability of quality may be further improved.

According to an aspect of the present invention, the transparent film may be manufactured by adjusting a drying speed in a drying process, after a solution casting process. In the drying process, the drying speed may be adjusted in two or more steps, and preferably three or more steps to manufacture a film. For example, the drying process may be performed by measuring the residual solvent content in a solution for preparing the transparent film, and then drying at a first drying speed in step 1, drying at a second drying speed in step 2, and followed by drying at a third drying speed in step 3, at different drying speeds in each step. The first to the third drying speeds may be identical to or different from one another. Preferably, in order to prevent the occurrence of the mura phenomenon in which the mura is generated on the film surface, the first to third drying speeds may all be different from each other. Here, in the drying process, step 1 to step 3 are sequentially performed.

More specifically, the first drying speed may be 100 to 900 g/m²·min, the second drying speed may be 10 to 400 g/m²·min, and the third drying speed may be 1 to 200 g/m²·min. Preferably, the first drying speed may be 300 to 900 g/m²·min, the second drying speed may be 10 to 350 g/m²·min, and the third drying speed may be 10 to 150 g/m²·min. When performed at the drying speed described above for a drying section depending on the residual solvent content by drying, the transparent film may satisfy the above Relational Expressions 1 and 2, and the mura phenomenon on the film surface does not substantially occur, and thus an excellent appearance quality may be implemented.

Preferably, in another aspect, in the drying process, the drying speed may be adjusted in four or more steps to manufacture a film. For example, the drying process may be performed by measuring the residual solvent content in a solution for preparing the transparent film, and then drying at a first drying speed in step 1, drying at a second drying speed in step 2, drying at a third drying speed in step 3, followed by drying at a fourth drying speed in step 4, at different drying speeds in each step. The first to the fourth drying speeds may be identical to or different from one another. Here, in the drying process, step 1 to step 4 are sequentially performed.

Preferably, in order to prevent the occurrence of the mura phenomenon in which the mura is generated on the film surface, the first to the fourth drying speeds may be different from each other in three or more steps. More preferably, the first to the fourth drying speeds may be different from each other in three or more step, and different drying speeds may be slowed down sequentially.

More specifically, the first drying speed may be 100 to 900 g/m²·min, the second drying speed may be 10 to 400 g/m²·min, the third drying speed may be 1 to 200 g/m²·min, and the fourth drying speed may be 1 to 150 g/m²·min. Preferably, the first drying speed may be 360 to 900 g/m²·min, the second drying speed may be 10 to 350 g/m²·min, the third drying speed may be 10 to 150 g/m²·min, and the fourth drying speed may be 10 to 130 g/m²·min. When performed at the drying speed for the drying section depending on the residual solvent content by drying as described above, the transparent film may satisfy the above Relational Expressions 1 and 2, and the mura phenomenon on the film surface does not substantially occur, and thus more excellent appearance quality may be implemented.

According to an aspect of the present invention, when the drying speed is three or more steps, the drying speed may satisfy the following Equations 1 and 2:

$$50 \leq V_1 - V_2 \leq 600 \quad \text{[Equation 1]}$$

$$10 \leq V_2 - V_3 \leq 300 \quad \text{[Equation 2]}$$

wherein $V_1$ is the first drying speed (g/m²·min) during the drying process of the transparent film, $V_2$ is the second drying speed (g/m²·min) during the drying process of the transparent film, and $V_3$ is the third drying speed (g/m²·min) during the drying process of the transparent film.

Preferably, Equation 1 may satisfy 50 to 550, and Equation 2 may satisfy 20 to 280.

In another aspect, when the drying speed is four or more steps, the drying speed may satisfy the above Equations 1 and 2, and the following Equation 3:

$$0 \leq V_3 - V_4 \leq 150 \quad \text{[Equation 3]}$$

wherein $V_3$ is the third drying speed (g/m²·min) during the drying process of the transparent film, and $V_4$ is the fourth drying speed (g/m²·min) during the drying process of the transparent film.

Preferably, the Equation 3 may satisfy 0 to 100.

If the drying speed satisfies the above Equations 1 and 2, or Equations 1 to 3 as described above, the transparent film may satisfy Relational Expressions 1 and 2, prevent the mura phenomenon on the film surface to implement excellent appearance quality, and prevent an increased rate in haze in a harsh environment.

In another aspect, when the drying speed is three or more step, the drying speed may satisfy the following Equation 4:

$$80 \leq \Delta V_1 - \Delta V_2 \leq 400 \quad \text{[Equation 4]}$$

wherein $\Delta V_1$ is a difference ($V_1 - V_2$) between the first drying speed (g/m²·min) and the second drying speed (g/m²·min) during the drying process of the transparent film, and $\Delta V_2$ is a difference ($V_2 - V_3$) between the second drying speed (g/m²·min) and the third drying speed (g/m²·min) during the drying process of the transparent film.

Preferably, Equation 4 may satisfy 85 to 350, and preferably 90 to 320.

If the drying speed satisfies the Equation 4 as described above, the appearance quality may be further improved so that there is virtually no mura while significantly reducing the micro non-uniformity of the surface.

According to an aspect of the present invention, the drying process may adjust a drying temperature, a drying air volume, a drying air speed, a support temperature, and a drying method in order to implement the drying speed in each step.

According to an aspect of the present invention, in the transparent film, one or more, preferably two or more, more preferably three or more, and most preferably four or more drying regions may be provided during the drying process. Here, the drying temperature, the drying air volume, the drying air speed, the support temperature, and the drying method in each drying region may be changed to suit the drying speed.

Specifically, according to an aspect, if three or more drying regions are configured, each region may be dried at different drying speeds so that the film may be dried while moving each region. When the drying speed is adjusted according to the region as described above, the drying speed may be adjusted without a section where the speed increases or decreases depending on a change in the drying speed, and thus the appearance quality may be further improved while significantly decreasing the micro non-uniformity of the surface.

According to an exemplary embodiment of the present invention, the transparent film may be dried in a drying region consisting of any one or two more nozzles selected from an impinged nozzle, a parallel flow nozzle, and a venturi type nozzle during the drying process. Various nozzles may be configured to adjust the drying speed as described above, and the drying speed may be adjusted to minimize the mura phenomenon. Thus, the transparent film may be used as an optical material with an excellent appearance quality and improved visibility.

According to an aspect of the present invention, the transparent film may have a thickness of 20 to 200 μm. Preferably, the transparent film may have a thickness of 20 to 150 μm, and more preferably, 20 to 100 μm. The transparent film may have the thickness as described above to satisfy the Relational Expressions 1 and 2 and to implement excellent visibility without the occurrence of the mura phenomenon.

Another aspect of the present invention is an optical material comprising the above-mentioned transparent film.

In the transparent film according to the present invention, the mura phenomenon in which the mura is generated during projection is suppressed, and thus the film may have excellent appearance quality and excellent visibility, and thus is excellent for use as an optical material.

The transparent film according to the present invention may be applied to a wide rage of fields, for example, heat-resistant high-tech materials such as automotive materials, aerospace materials, and spacecraft materials; and electronic materials such as insulating coating agents, insulating films, semiconductors, and electrode protective films of TFT-LCDs, but preferably to a display field such as a liquid crystal display device as an optical material.

Specifically, the transparent film according to the present invention may be applied to the display field as various optical materials selected from a cover window film, a protective film, a retardation film, a diffusion film, a flexible substrate, an encapsulant, a polarizer, and a touch panel substrate.

Another aspect of the present invention is a display device comprising the above-mentioned optical material. The display device may include the above-mentioned transparent film as an optical material, thereby minimize fatigue of user's eyes due to excellent visibility.

According to an aspect of the present invention, the display device is not particularly limited as long as it is a field requiring excellent optical properties, and may be applied to fields selected from, for example, a liquid crystal display, an organic EL display, and an electronic paper. In addition, depending on the field of application, display panel may be selected and provided. Specific examples may include, but are not limited to, any one or two or more selected from a touch sensor panel, an organic light emitting display panel, and a liquid crystal display panel.

A transparent film according to the present invention, an optical material comprising the same, and a display device comprising the same will be described in more detail through examples. The following Examples are only a reference for describing the present invention in detail, and the present invention is not limited thereto and may be implemented in various forms.

In addition, all technical terms and scientific terms have the same meanings as those commonly understood by a person skilled in the art to which the present invention pertains unless otherwise defined. The terms used herein are only for effectively describing a certain exemplary embodiment, and not intended to limit the present invention.

In addition, the unit of additives may be % by weight, unless otherwise described herein.

The physical properties of the present invention were measured as follows.

(1) Observation of Projected Appearance (Mura)

The projected appearance was observed by irradiation to be projected vertically onto a film of 500 mm×500 mm size using an HID (high intensity discharge) lamp. A projected image was projected onto a white back board, and the projected image was visually identified. Here, a position of the lamp-film-back board was adjusted to focus the projected image. When the mura was identified, NG/OK determination was performed according to a size and degree of recognition of the mura. It was considered as NG if the mura was 2 mm or more in width and had a clear shape when observed visually.

(2) T and θ

T and θ were obtained by measuring the transmittance and linear retardance values of the polarized light generated in a polarization state generator (PSG) using an Axoscan equipment manufactured by Axometrics. In particular, T was measured as a relative transmittance when the transmittance of a film having the linear retardance of 1° or less and having the same refractive index was calculated as 100%.

(3) Average Amplitude of Surface Roughness Curve and Curved Area

The transparent films of Examples and Comparative Examples were observed using a 3D foam tester (Keyence, VK-X1050). The surface roughness (Ra) value was measured in an area corresponding to 5 mm×5 mm of the film. Here, it was measured after fixing the film so as not to be lifted from a substrate when measuring. The surface roughness values in 15 adjacent regions were measured using the same method to calculate an average value. For the area of 5 mm×5 mm of the film, when the step of a plane without flexure is zero (0), as measured with a confocal microscope, the area (%) of the flexural portion was obtained by calculating using the following Equation 5:

$$\{\text{Area of region where the roughness value is 80 to 120\% of roughness average (Ra) value}\}/\{\text{area of total region}\} \times 100\% \quad \text{[Equation 5]}$$

(4) Measurement of Drying Speed

The drying speed in a dryer was calculated by measuring the residual solvent in the film that passed through each drying region. The residual solvent content in the film was determined to be a value obtained by subtracting a weight $A_{370}$ at 370° C. from the weight $A_{150}$ at 150° C. using a thermogravimetric analysis (TGA) (Discovery from TA). Here, the change in weight in a section of 150 to 370° C. was measured under a measurement condition that the temperature was raised to 400° C. at a temperature increase rate of 30° C./min.

PREPARATION EXAMPLE 1

[Molar Ratio of TFMB:6FDA:TPC=100:14:86]

Dimethylacetamide (DMAc) and 2,2'-bis(trifluoromethyl)-benzidine (TFMB) were added to a reactor under nitrogen atmosphere and stirred sufficiently, and then 4,4'-hexafluoroisopropylidene diphthalic anhydride (6FDA) was added thereto and stirred sufficiently until dissolved. Thereafter, terephthaloyl dichloride (TPC) was added thereto, and the mixture was dissolved and reacted by stirring for 6 hours to prepare a polyamic acid resin composition. Here, an amount of each monomer was determined that a molar ratio of TFMB:6FDA:TPC=100:14:86, and a temperature of the reactor was maintained at 30° C. Finally obtained polyamic acid resin composition had a viscosity of 33,000 cps. Then, pyridine and acetic anhydride were added to the polyamic acid resin composition at 2.5-fold moles of the total amount added of dianhydride, and stirred at 60° C. for 1 hour to prepare polymerization solution 1.

Thereafter, polymerization solution 1 was precipitated in excess methanol, filtered, and then the obtained solid was vacuum dried at 50° C. for 6 hours or more to obtain a polyamideimide. Finally obtained polyamideimide had a weight average molecular weight of 106,000 g/mol.

PREPARATION EXAMPLE 2

[Molar Ratio of TFMB:CBDA:IPC=100:60:40]

Dimethylacetamide (DMAc) and 2,2'-bis(trifluoromethyl)-benzidine (TFMB) were added to a reactor under nitrogen atmosphere and stirred sufficiently, and then 4,4'-cyclobutanetetracarboxylic dianhydride (CBDA) was added thereto and stirred sufficiently until dissolved. Thereafter, isophthaloyl dichloride (IPC) was added thereto, and the mixture was dissolved and reacted by stirring for 6 hours to prepare a polyamic acid resin composition. Here, an amount of each monomer was determined that a molar ratio of TFMB:CBDA:IPC=100:60:40, and a temperature of the reactor was maintained at 30° C. Finally obtained polyamic acid resin composition had a viscosity of 90,000 cps. Then, pyridine and acetic anhydride were added to the polyamic acid resin composition at 2.5-fold moles of the total amount added of dianhydride, and stirred at 60° C. for 1 hour to prepare polymerization solution 2.

Thereafter, polymerization solution 2 was precipitated in excess methanol, filtered, and then the obtained solid was vacuum dried at 50° C. for 6 hours or more to obtain polyamideimide. Finally obtained polyamideimide had a weight average molecular weight of 310,000 g/mol.

PREPARATION EXAMPLE 3

[Molar Ratio of TFMB:CBDA:IPC=100:40:60]

Dimethylacetamide (DMAc) and 2,2'-bis(trifluoromethyl)-benzidine (TFMB) were added to a reactor under nitrogen atmosphere and stirred sufficiently, and then 4,4'-cyclobutanetetracarboxylic dianhydride (CBDA) was added thereto and stirred sufficiently until dissolved. Thereafter, isophthaloyl dichloride (IPC) was added thereto, and the mixture was dissolved and reacted by stirring for 6 hours to prepare a polyamic acid resin composition. Here, the amount of each monomer was determined that a molar ratio of TFMB:CBDA:IPC=100:40:60, and the temperature of the reactor was maintained at 30° C. Finally obtained polyamic acid resin composition had a viscosity of 68,000 cps. Then, pyridine and acetic anhydride were added to the polyamic acid resin composition at 2.5-fold moles of the total amount added of dianhydride, and stirred at 60° C. for 1 hour to prepare polymerization solution 3.

Thereafter, polymerization solution 3 was precipitated in excess methanol, filtered, and then the obtained solid was vacuum dried at 50° C. for 6 hours or more to obtain polyamideimide. Finally obtained polyamideimide had a weight average molecular weight of 180,000 g/mol.

The obtained polymerization solutions were cast onto a glass substrate using a slot die, and then dried through a drying condition below to obtain a transparent film having a thickness of 30 to 80 μm. The constitution according to the type of the used polymerization solution, the configuration of the drying nozzle, and the drying speed, is shown by the Examples and Comparative Examples described in Table 1.

TABLE 1

| | Type of polymerization solution | Nozzle drying method | Drying speed (g/m² · min) | | | | Method of adjusting the drying speed in each step |
| --- | --- | --- | --- | --- | --- | --- | --- |
| | | | Step 1 | Step 2 | Step 3 | Step 4 | |
| Example 1 | Polymerization solution 1 | Impinged | 400 | 225 | 100 | 25 | Drying temperature |
| Example 2 | Polymerization solution 1 | Parallel | 385 | 300 | 50 | 25 | Drying temperature |
| Example 3 | Polymerization solution 1 | Venturi type | 425 | 225 | 100 | — | Drying temperature |
| Example 4 | Polymerization solution 2 | Impinged | 460 | 190 | 85 | 15 | Drying air volume |
| Example 5 | Polymerization solution 2 | Parallel | 575 | 75 | 50 | 50 | Drying air volume |
| Example 6 | Polymerization solution 2 | Venturi type | 535 | 140 | 42 | 33 | Drying air volume |
| Example 7 | Polymerization solution 3 | Impinged | 490 | 210 | 25 | 25 | Support temperature |
| Example 8 | Polymerization solution 3 | Parallel | 475 | 150 | 125 | — | Support temperature |
| Comp. Example 1 | Polymerization solution 1 | Impinged | 100 | — | — | — | — |
| Comp. Example 2 | Polymerization solution 1 | Parallel | 150 | 350 | 125 | 125 | Drying temperature |
| Comp. Example 3 | Polymerization solution 2 | Parallel | 525 | 225 | — | — | Drying temperature |
| Comp. Example 4 | Polymerization solution 2 | Venturi type | 75 | 75 | 490 | 110 | Drying air volume |
| Comp. Example 5 | Polymerization solution 3 | Impinged | 200 | 200 | 200 | 150 | Drying air volume |
| Comp. Example 6 | Polymerization solution 3 | Venturi type | 150 | 150 | 150 | 300 | Support temperature |

Physical properties of the Examples and Comparative Examples described in Table 1 were measured and are shown in Table 2 below.

TABLE 2

| | T | θ (°) | Average step of flexure (nm) | Flexural area (%) | Evaluation result of projected image |
| --- | --- | --- | --- | --- | --- |
| Example 1 | 0.920A | 25 | 20 | 60 | OK |
| Example 2 | 0.918A | 19 | 25 | 58 | OK |
| Example 3 | 0.910A | 17 | 10 | 47 | OK |
| Example 4 | 1.030A | 8 | 15 | 25 | OK |
| Example 5 | 1.080A | 16 | 23 | 38 | OK |
| Example 6 | 0.997A | 20 | 24 | 44 | OK |
| Example 7 | 1.010A | 12 | 18 | 53 | OK |
| Example 8 | 0.991A | 2.7 | 29 | 62 | OK |
| Comp. Example 1 | 1.120A | 4.8 | 325 | 87 | NG |
| Comp. Example 2 | 0.994A | 32 | 127 | 58 | NG |
| Comp. Example 3 | 0.890A | 2.2 | 35 | 82 | NG |
| Comp. Example 4 | 1.400A | 27 | 132 | 57 | NG |
| Comp. Example 5 | 1.170A | 9 | 215 | 53 | NG |
| Comp. Example 6 | 0.890A | 38 | 28 | 68 | NG |

As shown in Table 2, it could be confirmed that the transparent film according to the present invention satisfies Relational Expressions 1 and 2, and thus has excellent appearance characteristics that a chrominance and transmittance non-uniformity hardly occurs. Furthermore, it may be achieved by satisfying a certain range of drying speed. In addition, when the drying speed satisfies the above Equations 1 to 3, the Relational Expressions 1 and 2 are satisfied, such that the curved area is reduced, and the mura such as an optical pattern on the surface of the film is significantly reduced depending on light or angle, and thus excellent surface quality may be provided.

Furthermore, it was confirmed that in Examples 4, 6, 7, and 8 satisfying all of the above Equations 1 to 4, the mura phenomenon of the film surface hardly occurs, and thus a more excellent appearance quality may be implemented compared to other Examples.

Thus, the transparent film according to the present invention may minimize a mura phenomenon, and may be used as an optical material with an excellent appearance quality and improved visibility.

The transparent film according to the present invention has an advantage of having excellent appearance quality that does not generate the mura.

In addition, the transparent film according to the present invention has an advantage in that an optical pattern may be reduced to provide a display device having excellent visibility.

Further, the transparent film according to the present invention has an advantage of not only having excellent display quality but also being able to provide a flexible display device due to its flexibility.

Hereinabove, although the present invention has been described by specific matters, the limited embodiments, have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A transparent polyimide-based film in which light which is generated when one polarized light is transmitted through the film and in which two waves are mixed with each other satisfies the following Relational Expressions 1 and 2:

$$0.90\,A \leq T \leq 1.10\,A \quad \text{[Relational Expression 1]}$$

$$\theta \leq 30 \quad \text{[Relational Expression 2]}$$

wherein T is the sum of magnitudes of amplitudes when the two waves of the transmitted light interfere with each other, A is a wave's amplitude of the polarized light, and $\theta$ is a retardance angle (°) of a wave traveling to a slow axis of the transparent film, of the two waves, and wherein the transparent film is manufactured using a drying process after solution casting, the drying process comprises two or more drying steps, and the drying conditions in at least two of the drying steps is different.

2. The transparent film of claim 1, wherein the transparent film has an average amplitude of a surface roughness curve of 1 to 1,000 nm.

3. The transparent film of claim 1, wherein the transparent film has a curved area of 70% or less with respect to the overall surface area.

4. The transparent film of claim 1, wherein the transparent film has a thickness of 20 to 200 μm.

5. The transparent film of claim 1, wherein the transparent film has a residual solvent content within 3% by weight with respect to the total weight of the film.

6. The transparent film of claim 1, wherein the drying process is performed in a drying region in which each drying step is carried out using one or more nozzles selected from an impinged nozzle, a parallel flow nozzle, and a venturi type nozzle.

7. An optical material comprising the transparent film of claim 1.

8. A display device comprising the optical material of claim 7.

* * * * *